United States Patent
Hung et al.

(10) Patent No.: US 10,396,471 B2
(45) Date of Patent: Aug. 27, 2019

(54) THREE POLARIZATION MIMO ANTENNA SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chih-Ming Hung, New Taipei (TW); Han-Ping Mi, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/482,926

(22) Filed: Apr. 10, 2017

(65) Prior Publication Data
US 2018/0013209 A1    Jan. 11, 2018

(30) Foreign Application Priority Data
Jul. 6, 2016 (TW) .............................. 105121349 A

(51) Int. Cl.
*H01Q 1/40* (2006.01)
*H01Q 21/24* (2006.01)
(Continued)

(52) U.S. Cl.
CPC ............... *H01Q 21/24* (2013.01); *H01Q 7/00* (2013.01); *H01Q 9/0414* (2013.01);
(Continued)

(58) Field of Classification Search
CPC .......... H01Q 1/40; H01Q 9/40; H01Q 9/0407; H01Q 1/38; H01Q 1/48
(Continued)

(56) References Cited

U.S. PATENT DOCUMENTS

| 5,043,738 A * | 8/1991 | Shapiro ................ H01Q 21/065 343/700 MS |
| 8,179,324 B2 | 5/2012 | Rao et al. |
| 2008/0180329 A1* | 7/2008 | Takeishi ................ H01Q 13/18 343/700 MS |

FOREIGN PATENT DOCUMENTS

| CN | 101615724 A | 12/2009 |
| CN | 103337696 A | 10/2013 |

(Continued)

OTHER PUBLICATIONS

Zhong Hua, Zhang Zhijun, Chen Wenhua, Feng Zhenghe, Magdy Iskander <A Conformal Tri-polarization Antenna Fed by Proximity Coupling and Probe> <Proceedings of the 2009 National Microwave Millimeter Wave Conference> HCAC, University of Hawaii, Honolulu, HI, USA May 23, 2009.

*Primary Examiner* — Dameon E Levi
*Assistant Examiner* — Collin Dawkins
(74) *Attorney, Agent, or Firm* — ScienBiziP, P.C.

(57) ABSTRACT

An antenna system is set in a substrate. The substrate includes a first floor, a second floor, a third floor, a fourth floor, and a ground plane. The antenna system further includes at least one radiation part, including a first radiation part, a second radiation part, and a third radiation part. The antenna system further includes at least one signal feed part set in the fourth floor, configured to feed electromagnetic wave signal. The feed part comprises a first feed part, a second feed part, and a third feed part. The antenna system 10 employs simple hierarchical structure, is low cost, and occupies a little space. The antenna system also has advantages of high gain, low loss, and high stability in 2.412 GHz~2.472 GHz frequency band.

6 Claims, 9 Drawing Sheets

(51) Int. Cl.
  *H04B 7/0413* (2017.01)
  *H01Q 7/00* (2006.01)
  *H01Q 9/04* (2006.01)
  *H01Q 21/28* (2006.01)
  *H01Q 1/52* (2006.01)

(52) U.S. Cl.
  CPC .......... *H01Q 9/0457* (2013.01); *H01Q 21/28* (2013.01); *H04B 7/0413* (2013.01); *H01Q 1/52* (2013.01)

(58) Field of Classification Search
  USPC .................... 343/873, 829, 846, 700 MS
  See application file for complete search history.

(56) References Cited

FOREIGN PATENT DOCUMENTS

| | | |
|---|---|---|
| CN | 103858277 A | 6/2014 |
| JP | 107249933 A | 9/1995 |

* cited by examiner

THREE POLARIZATION MIMO ANTENNA SYSTEM

FIELD

The subject matter herein generally relates to wireless communication field, and particularly to a three polarization multiple input multiple output (MIMO) antenna system.

BACKGROUND

With the development of wireless communication technology, the channel capacity of antenna system becomes unable to match desired speed of wireless communications. Research shows that MIMO technology could remarkably enlarge channel capacity. Employing multi-antennas in both transmitting end and receiving end could greatly elevate spectrum efficiency and transmitting efficiency. More and more MIMO antenna systems have been developed to realize three directions orthogonal polarization. However, conventional three polarization MIMO antenna has too large of a volume but also costs too much to fabricate; it is not convenient to popularize.

BRIEF DESCRIPTION OF THE DRAWINGS

Implementations of the present technology will now be described, by way of example only, with reference to the attached figures.

DETAILED DESCRIPTION

Figure 1:
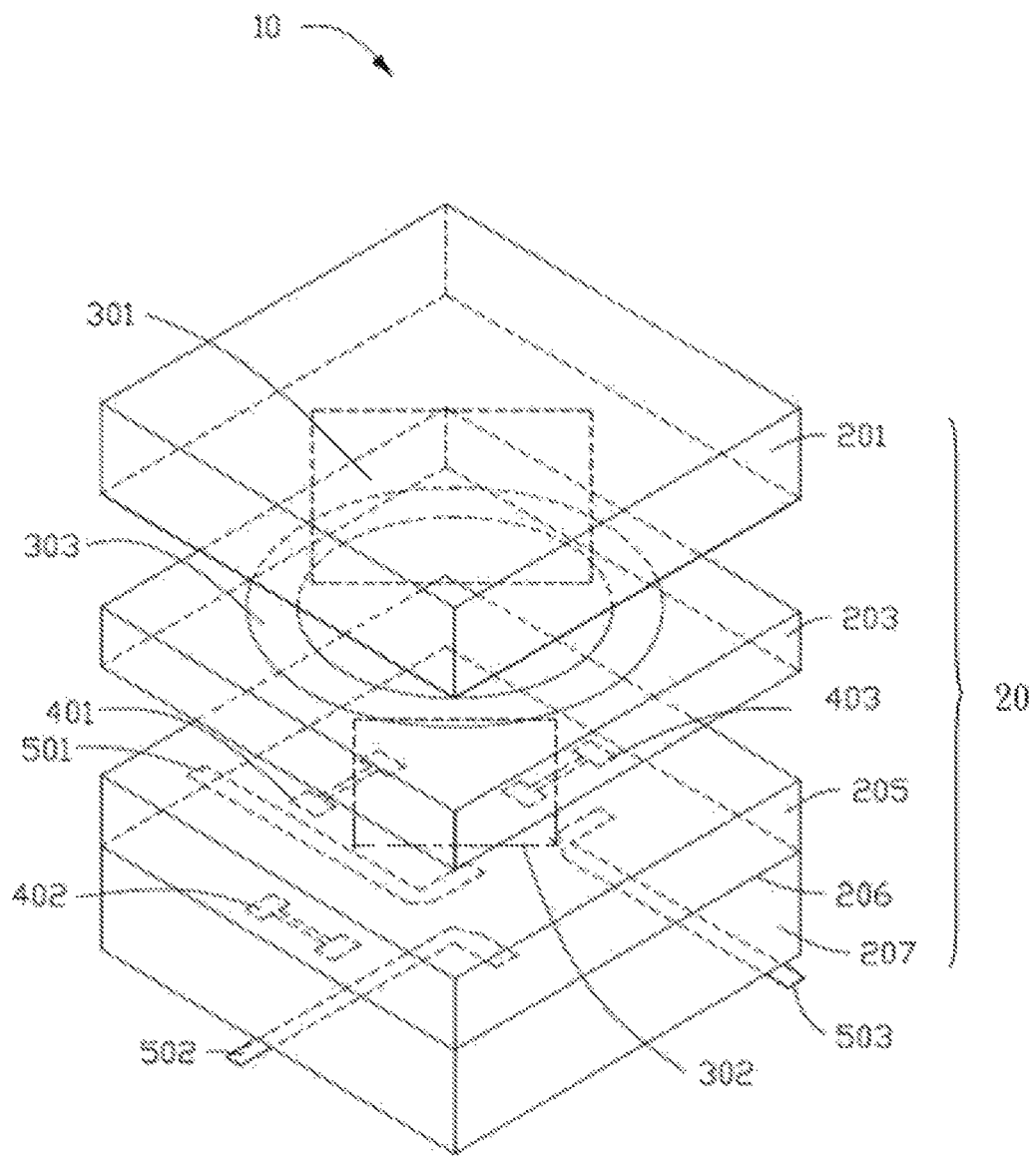
FIG. 1 is a space diagram of an embodiment of an antenna system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a first embodiment of an antenna system 10. In one embodiment, the antenna system 10 is set in a substrate 20. The substrate 20 comprises a first floor 201, a second floor 203, a third floor 205, and a fourth floor 207, and the four floors are set in parallel with each other. A first interval is set between the first floor 201 and the second floor 203. In one embodiment, the interval can be a substrate. A second interval is set between the second floor 203 and the third floor 205. A ground plane 206 is set between the third floor 205 and the fourth floor 207. In one embodiment, the first interval and the second interval can be dielectric.

In one embodiment, the antenna system 10 comprises at least one radiation part. The at least one radiation part comprises a first radiation part 301, a second radiation part 302, and a third radiation part 303. The at least one radiation part can be metal layers set in the substrate 20. The first radiation part 301 can be in form of a square, set on a first floor 201 lower surface, and the first floor 201 lower surface is closer to the second floor 203 than a first floor 201 upper surface. The second radiation part 302 can be in form of a square, set on a third floor 205 upper surface, and the third floor 205 upper surface is closer to the second floor 203 than a third floor 205 lower surface. The third radiation part 303 can be annular, set on a second floor 203 upper surface, and the second floor 203 upper surface is closer to the first floor 201 than a second floor 203 lower surface. It should be understood that shapes formed by the first radiation part 301, the second radiation part 302, and the third radiation part 303 can be other than square, circular, annular, oval, diamond-shape, and rectangular.

In one embodiment, the ground plane 206 can be a metal layer. The ground plane 206 comprises at least one slot, and the at least one slot comprises a first slot 401, a second slot 402, and a third slot 403. The at least one slot can be I-shape. The antenna system 10 further comprises a ground part, the ground part can be the ground plane 206. The first slot 401 is located in a square projection of the first radiation part 301 in the ground plane 206, and the first slot 401 is perpendicular to a diagonal of the square projection of the first radiation part 301. A first slot 401 center is located in a diagonal of the square projection of the first radiation part 301. The second slot 402 is located in a square projection of the second radiation part 302 in the ground plane 206, and the second slot 402 is perpendicular to a diagonal of the square projection of the second radiation part 302. A second slot 402 center is located in a diagonal of the square projection of the second radiation part 302. The size of the second slot 402 and the first slot 401 can be similar, and the first slot 401 is perpendicular to the second slot 402. The third slot 403 traverses an annular projection of the third radiation part 303 in the ground plane 206. The third slot 403 is located in a diameter of the annular projection of the third radiation part 303. In other embodiments, the third slot 403 can be located in other place as long as the third slot 403 is located in a diameter of the annular projection of the third radiation part 303. In other embodiments, the first slot 401, the second slot 402, and the third slot 403 can be shape of long strip or other shape.

In one embodiment, the antenna system 10 further comprises at least one feed part. The at least one feed part comprises a first feed part 501, a second feed part 502, and a third feed part 503, configured to feed electromagnetic wave signal. The first feed part 501, second feed part 502, and third feed part 503 can be L-shape metal layers set in a lower surface of the fourth floor 207. The L-shape metal layers comprise a long end that is perpendicular to a short end and a corner coupling the short end and the long end. A first feed part 501 long end perpendicularly traverses an I-shape projection of the first slot 401 in the fourth floor 207. A second feed part 502 long end perpendicularly traverses an I-shape projection of the second slot 402 in the fourth floor 207, and a second feed part 502 short end extends away from the first feed part 501. A first feed part 501 short end extends away from the second feed part 502. The size of the first feed part 501 and the second feed part 502 is similar. A third feed part 503 long end perpendicularly traverses an I-shape projection of the third slot 403 in the fourth floor 207, and a third feed part 503 short end extends away from the annular projection of the third radiation part 303 in the fourth floor 207. The at least one feed part is configured to feed electromagnetic wave signal, the electromagnetic wave signal being radiated via intercoupling between slots and radiation parts.

Figure 2:
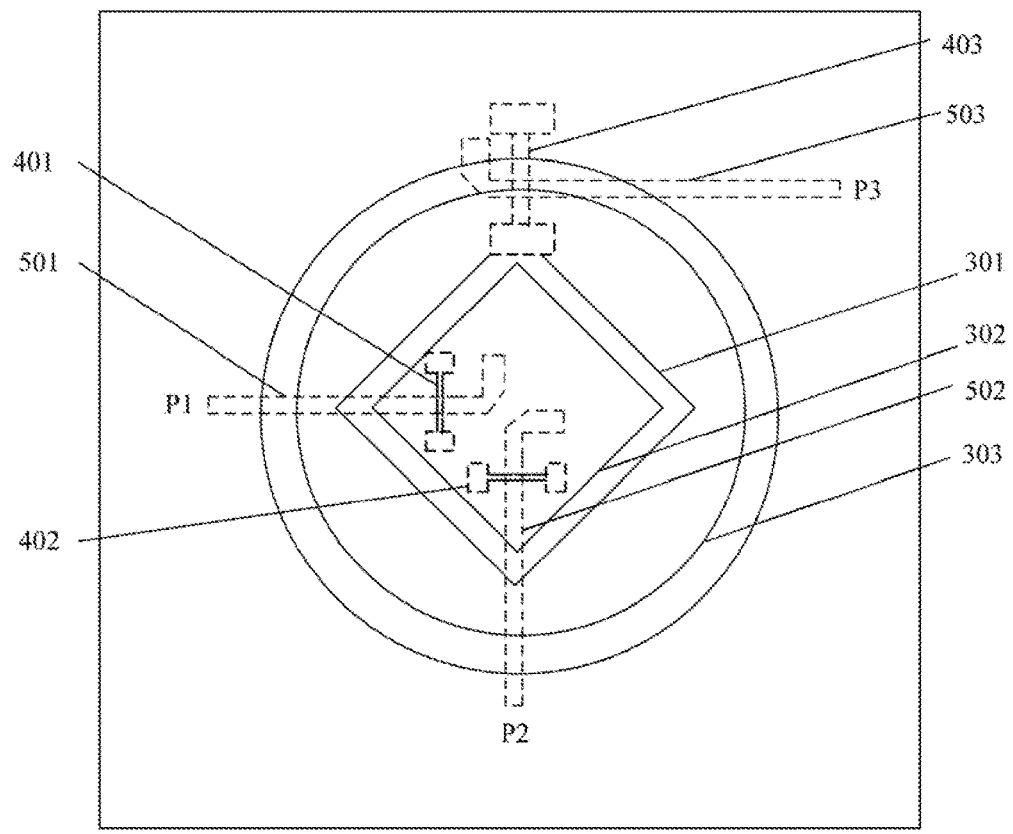
FIG. 2 is a projection diagram of an antenna system.

FIG. 2 shows a projection diagram of an embodiment of antenna system 10.

In one embodiment, the first radiation part 301 can be square, the second radiation part 302 can be square, and the third radiation part can be annular. The first slot 401 is located in a square projection of the first radiation part 301 in the ground plane 206. The first slot 401 is also perpendicular to a diagonal of the square projection of the first radiation part 301, and a first slot 401 center is located in the diagonal of the square projection of the first radiation part 301. The second slot 402 is located in a square projection of the second radiation part 302 in the ground plane 206, and the second slot 402 is perpendicular to a diagonal of the square projection of the second radiation part 302. A second slot 402 center is located in a diagonal of the square projection of the second radiation part 302. The size of the second slot 402 and the first slot 401 can be similar, and the first slot 401 is perpendicular to the second slot 402. The third slot 403 crosses an annular projection of the third radiation part 303 in the ground plane 206. The third slot 403 is located in a diameter of the annular projection of the third radiation part 303. In other embodiment, the third slot 403 can be located in other place as long as the third slot 403 is located in a diameter of the annular projection of the third radiation part 303. In other embodiment, the first slot 401, the second slot 402, and the third slot 403 can be shape of long strip or other shape.

In one embodiment, the first feed part 501, the second feed part 502, and the third feed part 503 are configured to feed electromagnetic wave signal. The first feed part 501 comprises a first feed part port P1, and the first feed part 501 long end perpendicularly traverses a central position of I-shape projection of the first slot 401. The second feed part 502 comprises a second feed part port P2. The second feed part 502 long end perpendicularly traverses a central position of I-shape projection of the second slot 402, and the second feed part 502 short end extends away from the first feed part 501. The first feed part 501 short end extends away from the second feed part 502. The size of the first feed part 501 and the second feed part 502 is similar. The third feed part 503 comprises a third feed part port P3. The third feed part 503 long end perpendicularly traverses a central position of I-shape projection of the third slot 403, and the third feed part 503 short end extends away from the annular projection of the third radiation part 303. The at least one feed part radiates electromagnetic wave signal via intercoupling between slots and radiation parts.

Figure 3:
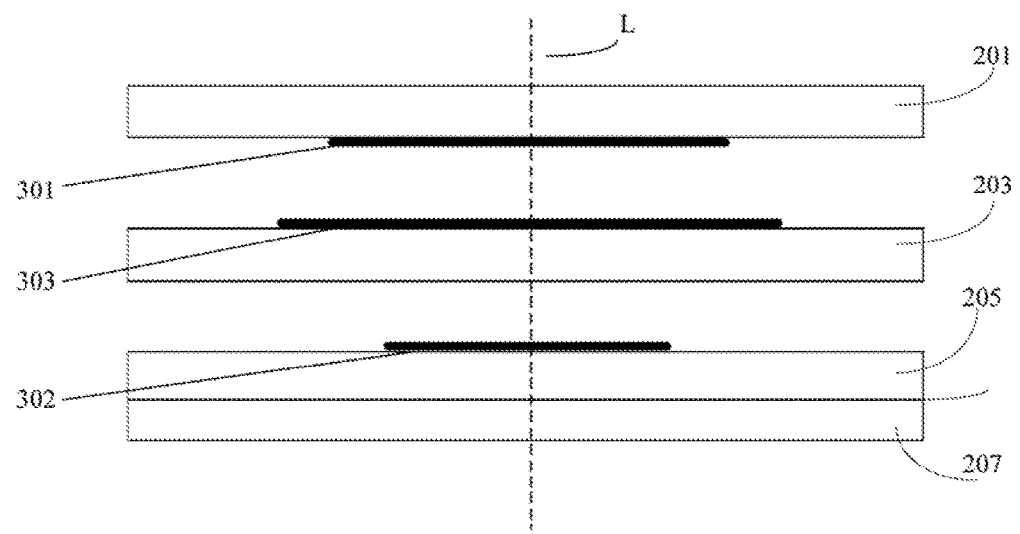
FIG. 3 is a side view of an embodiment of the antenna system of FIG. 1.

FIG. 3 shows a side view of an embodiment of the antenna system 10.

In one embodiment, the first radiation part 301 is set on the first floor 201 lower surface, and the first floor 201 lower surface is closer to the second floor 203 than the first floor 201 upper surface. The second radiation part 302 is set on the third floor 205 upper surface, and the third floor 205 upper surface is closer to the second floor 203 than the third floor 205 lower surface. The third radiation part 303 is set on the second floor 203 upper surface, and the second floor 203 upper surface is closer to the first floor 201 than the second floor 203 lower surface. In one embodiment, geometric centers of the first radiation part 301, the second radiation part 302, and the third radiation part 303 are located in a line L. The line L perpendicularly traverses the substrate 20 and the geometric center of the substrate 20. In other embodiment, the line L can be set in other position when the shape of the substrate 20 is changed.

Figure 4:
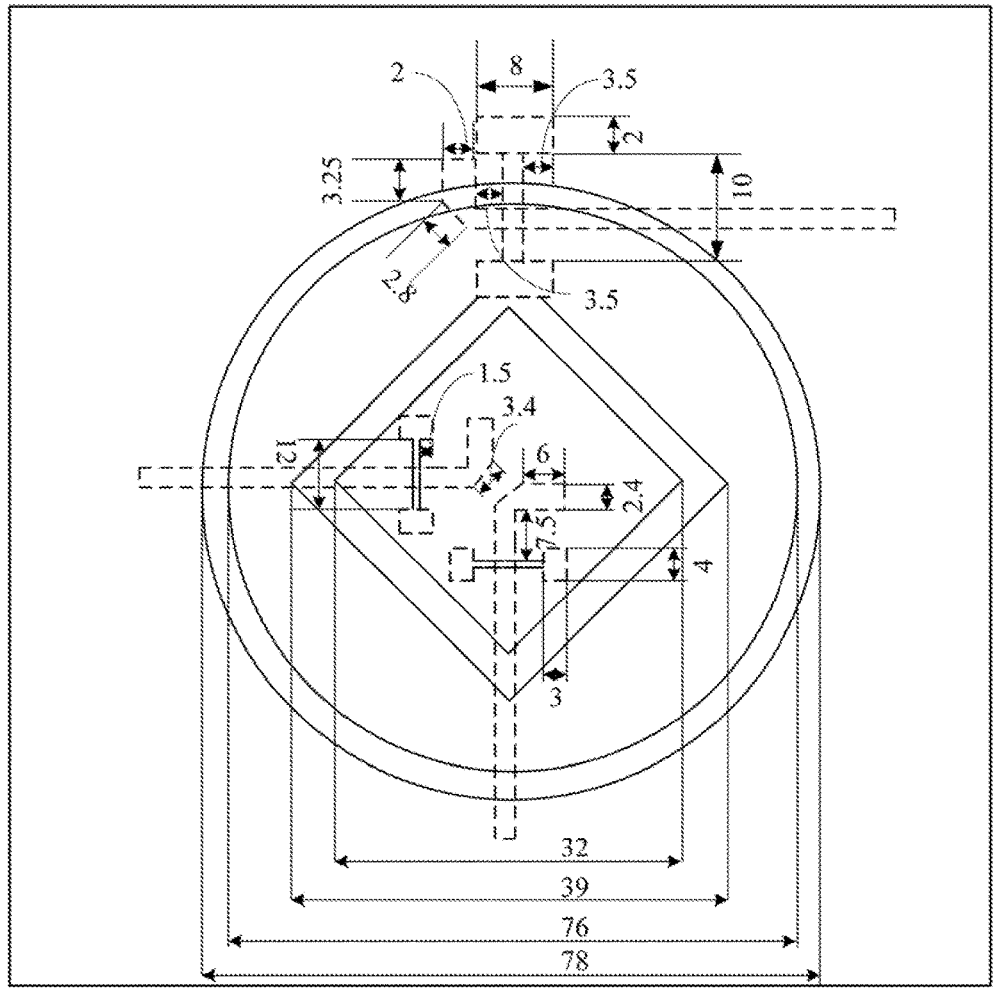
FIG. 4 is a dimensional diagram of an embodiment of the antenna system of FIG. 1.

FIG. 4 shows a dimension diagram of an embodiment of the antenna system 10.

In one embodiment, the permittivity of the first floor, the second floor, the third floor, and the fourth floor respectively can be 2.33, 2.33, 2.33, and 2.2. The thicknesses respectively can be 1.6 mm, 1.6 mm, 1.6 mm, and 0.8 mm. The first interval can be 3.4 mm, the second interval can be 2 mm. The diagonal of the first radiation part 301 can be 39 mm, and the diagonal of the second radiation part 302 can be 32 mm. Diameter of outer ring of the third radiation part 303 can be 78 mm, and diameter of inner ring of the third radiation part can be 76 mm. Length and width of middle part of the first slot 401 can respectively be 12 mm and 1 mm. Length and width of both ends of the first slot 401 can respectively be 3 mm and 4 mm. Size of the first slot 401 and the second slot 402 can be similar. Length and width of middle part of the third slot 403 can respectively be 10 mm and 1 mm. Length and width of both ends of the third slot 403 can respectively be 2 mm and 8 mm. Width of the first feed part 501 can be 2.4 mm, and length of the first feed part 501 short end can be 6 mm. The length of a first feed part 501 corner can be 3.4 mm, and length between the first feed part 501 short end and the first slot 401 can be 7.5 mm. The size of the second feed part 502 can be same as the first feed part 501. Width of the third feed part 503 can be 2 mm, and length of the third feed part 503 short end can be 3.25 mm. The width of the third feed part 503 corner can be 2.8 mm, and length between the third feed part 503 short end and the third slot 403 can be 3.5 mm. In other embodiments, the size and parameters of the substrate and its components can be different.

Figure 5:
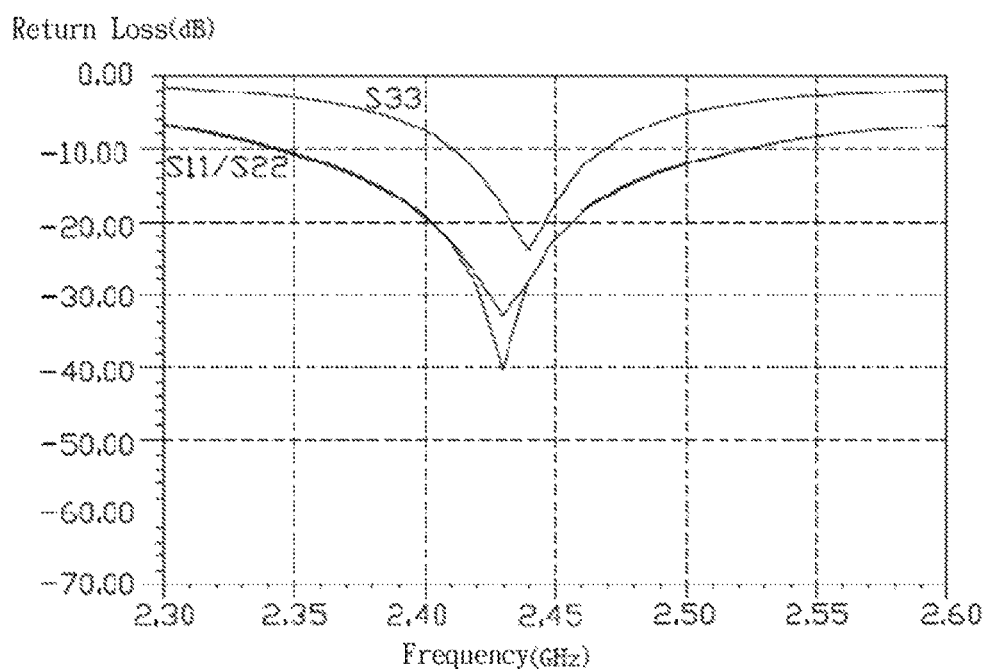
FIG. 5 is a return loss simulation diagram of an embodiment of the antenna system of FIG. 1.

FIG. 5 shows return loss simulation diagram of an embodiment of the antenna system 10. In one embodiment, the antenna system 10 can work in frequency band of between 2.412 GHz~2.472 GHz. The return loss simulation parameters S11, S22, and S33 are lower than −10 dB.

Figure 6:
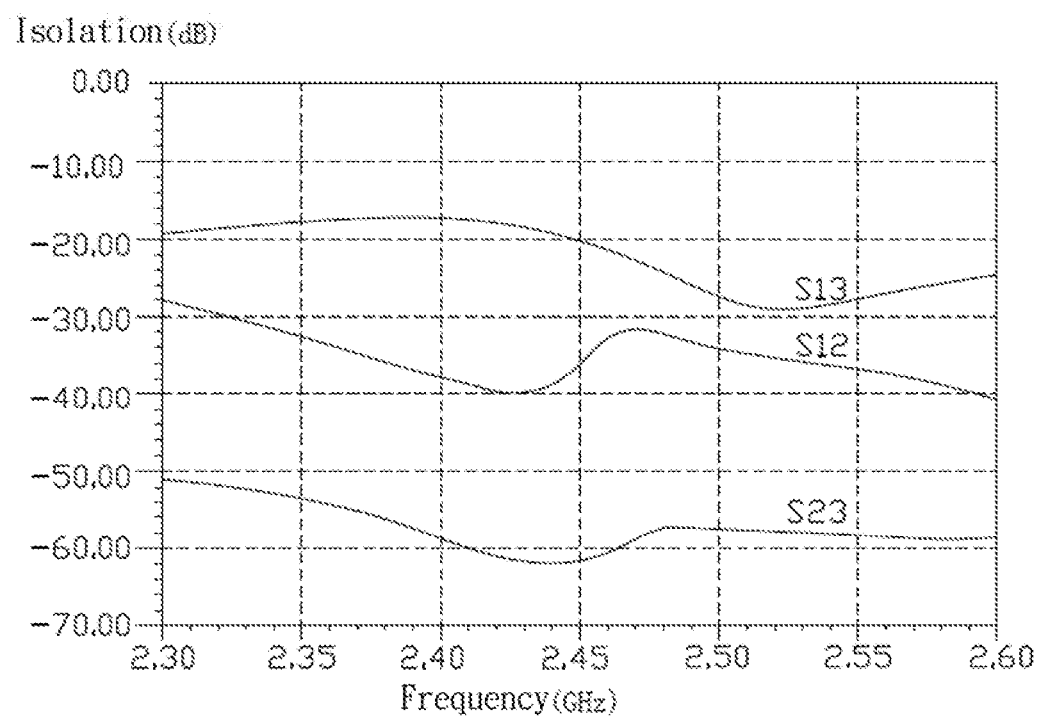
FIG. 6 is an isolation simulation diagram of an embodiment of the antenna system of FIG. 1.

FIG. 6 shows an isolation simulation diagram of an embodiment of the antenna system 10. In one embodiment, the antenna system 10 works in frequency band of between 2.412 GHz~2.472 GHz. The isolation parameter S12 between the first feed part port P1 and the second feed part port P2 is lower than −30 dB. The isolation parameter S13 between the first feed part port P1 and the third feed part port P3 is lower than −18 dB. The isolation parameter S23 between the second feed part port P2, and the third feed part port P3 is lower than −55 dB. The result shows that effects of electromagnetic isolation among the first feed part port P1, the second feed part port P2, and the third feed part port P3 are good, that is, that mutual electromagnetic interference is low.

Figure 7:
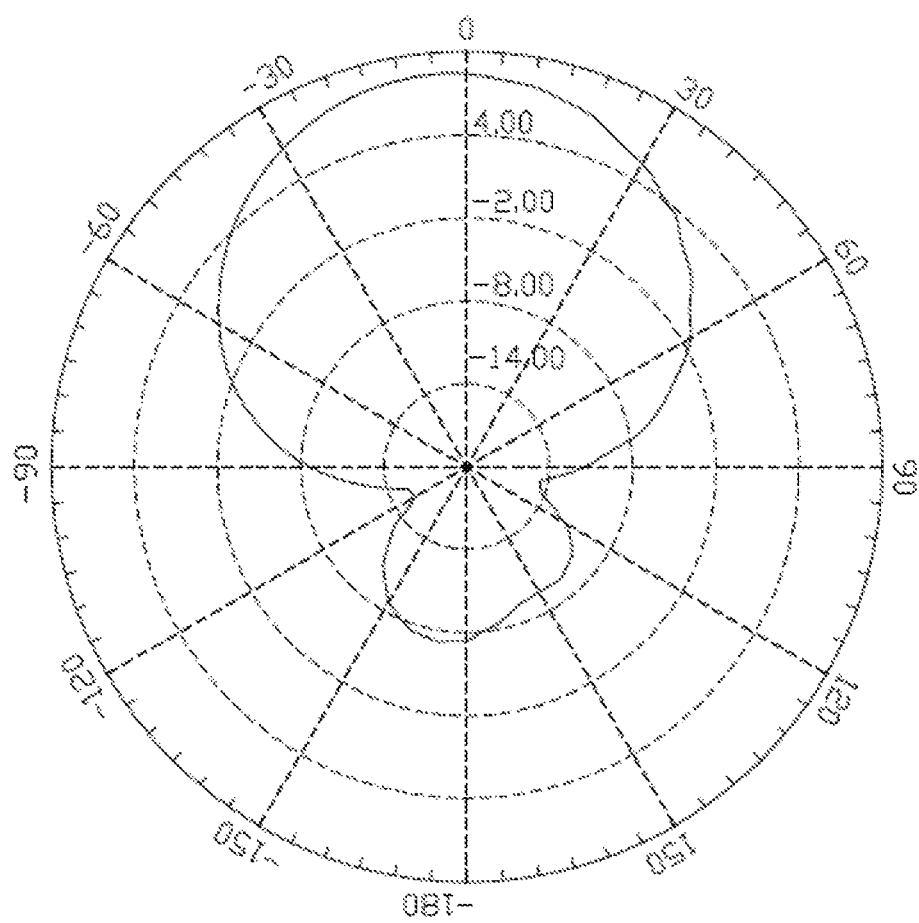
FIG. 7, FIG. 8 are antenna gain simulation diagrams of an embodiment of the antenna system of FIG. 1.
Figure 8:
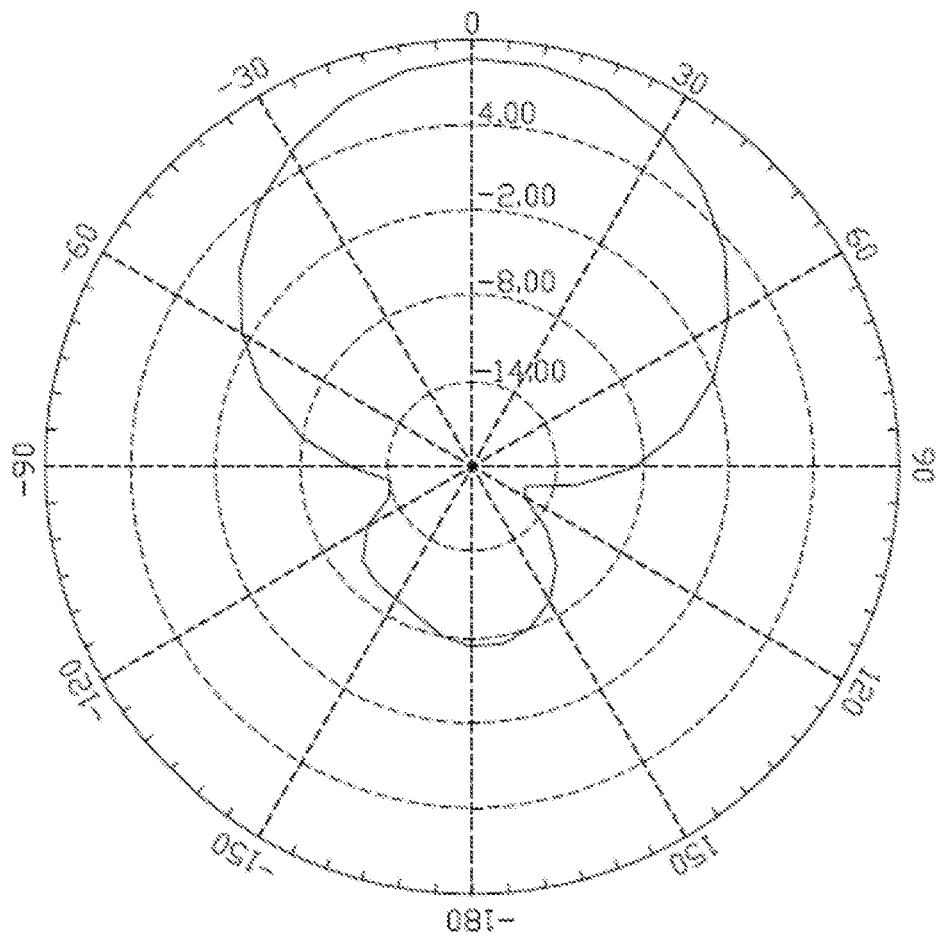

FIG. 7 and FIG. 8 show simulation diagrams for antenna gain of an embodiment of the antenna system 10. FIG. 7 shows X-Z plane, and FIG. 8 shows Y-Z plane. In one embodiment, when the antenna system 10 works at 2.44 GHz, the antenna system 10 radiates to three directions, and it shows the antenna system 10 is a three polarization antenna system.

Figure 9:
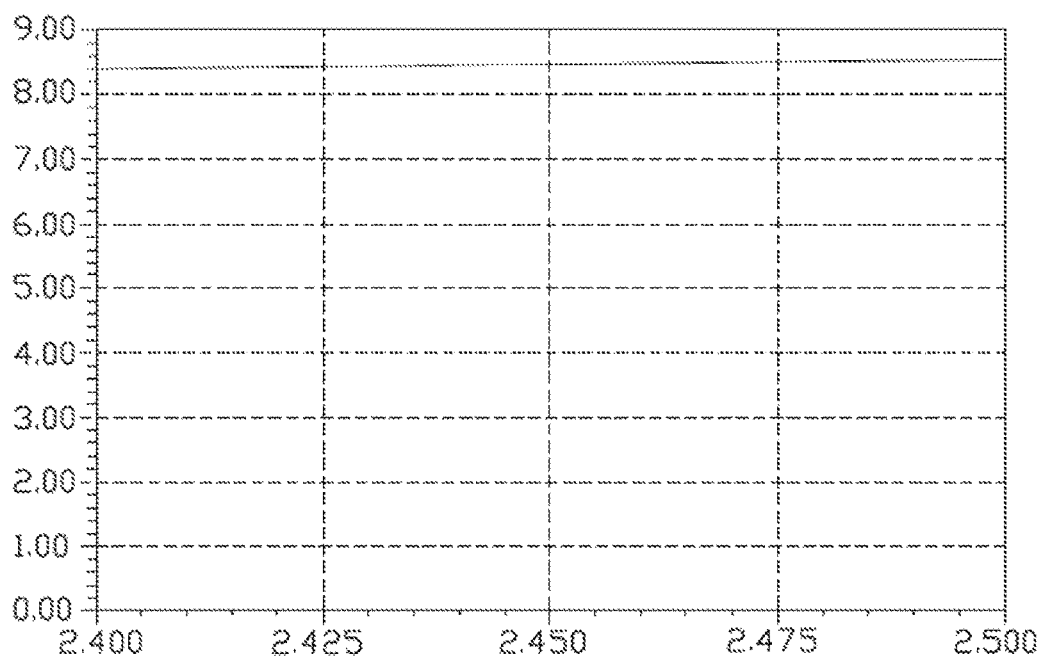
FIG. 9 is a diagram of an embodiment of the antenna system of FIG. 1 showing maximum antenna gain.

FIG. 9 shows maximum antenna gain of an embodiment of the antenna system 10. In one embodiment, when the antenna system 10 works between 2.412 GHz-2.472 GHz, the maximum antenna gain is greater than 8 dB.

The antenna system 10 forms three direction polarization via intercoupling among several slots and radiation parts. Channel capacity and transmission efficiency of antennas are elevated. The antenna system 10 employs hierarchical structure and it occupies a little space. It has advantages of simple and convenient structure, wide application, and low price. The antenna system 10 also has advantages of high gain, low loss, and high stability in 2.412 GHz~2.472 GHz band.

Many details are often found in the art such as the other features of the antenna system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna system, set in a substrate, the substrate comprising a first floor, a second floor, a third floor, a fourth floor, and a ground plane, the antenna system comprising:
   at least one radiation part, configured to radiate an electromagnetic wave signal, comprising:
      a first radiation part defining a square shape, and set in a first floor surface closed to the second floor;
      a second radiation part defining a square shape, set in a third floor surface closed to the second floor;
      a third radiation part defining an annular shape, set in a second floor surface close to the first floor;
   at least one feed part, set in the fourth floor, configured to feed the electromagnetic wave signal, and the at least one feed part comprising a first feed part, a second feed part, and a third feed part;
   a first slot, set in the ground plane, wherein the first slot is located in a first radiation part square projection in the ground plane, the first slot is perpendicular to a first radiation part square projection diagonal, and a first slot center is located in the first radiation part square projection diagonal;
   a second slot, set in the ground plane, wherein the second slot is located in a second radiation part square projection in the ground plane, the second slot is perpendicular to the first slot and a second radiation part square projection diagonal, and a second slot center is located in the second radiation part square projection diagonal; and
   a third slot, set in the ground plane, wherein the third slot traverses a third radiation part annular projection in the ground plane, and the third slot is located in a third radiation part annular projection diameter.

2. The antenna system of claim 1, wherein the first floor, the second floor, the third floor and the fourth floor are set in successively and in parallel, and the antenna system further comprises:
   a first interval, set between the first floor and the second floor;
   a second interval, set between the second floor and the third floor; and
   the ground plane, set between the third floor and the fourth floor.

3. The antenna system of claim 2, wherein the first interval and the second interval are dielectric.

4. The antenna system of claim 1, wherein geometric centers of the first radiation part, the second radiation part and the third radiation part are located along a line.

5. The antenna system of claim 1, wherein the first slot, the second slot and the third slot define an I-shape.

6. The antenna system of claim 1, wherein:
   the at least one feed part define an L-shape, comprising a long end, a short end and a corner coupled to the short end and the long end, the long end of the first feed part perpendicularly traverses an I-shape projection central position of the first slot in the fourth floor, wherein:
   a second feed part long end perpendicularly traverses a second slot I-shape projection central position in the fourth floor, a second feed part short end extends away from the first feed part, and a first feed part short end extends away from the second feed part; and
   a third feed part long end perpendicularly traverses a third slot I-shape projection central position in the fourth floor, and a third feed part short end extends away from a third radiation part annular projection in the fourth floor.

* * * * *